United States Patent [19]

Lapp et al.

[11] 3,829,941

[45] Aug. 20, 1974

[54] MACHINE FOR WINDING AN ELECTRICAL CAPACITOR

[75] Inventors: John Lapp, Franklin; Norbert R. Weiler, Greendale, both of Wis.

[73] Assignee: McGraw-Edison Company, Elgin, Ill.

[22] Filed: Apr. 9, 1973

[21] Appl. No.: 349,247

Related U.S. Application Data

[62] Division of Ser. No. 255,156, May 10, 1972, Pat. No. 3,746,953.

[52] U.S. Cl............... 29/25.42, 242/56.1, 317/260
[51] Int. Cl........................................... H01g 13/00
[58] Field of Search................... 317/258, 259, 260; 174/25 R; 29/25.42, 605; 242/56.1

[56] References Cited
UNITED STATES PATENTS

| | | | |
|---|---|---|---|
| 1,770,851 | 7/1930 | Hayman | 174/25 R |
| 3,027,628 | 4/1962 | Wilk et al. | 29/605 |
| 3,430,116 | 2/1969 | Johnstone | 317/260 X |
| 3,432,901 | 3/1969 | Fanning | 29/25.42 |
| 3,450,968 | 6/1969 | Cox | 317/258 |
| 3,588,644 | 6/1971 | Nash et al. | 317/259 |

FOREIGN PATENTS OR APPLICATIONS

| | | | |
|---|---|---|---|
| 106,535 | 2/1939 | Australia | 317/260 |

Primary Examiner—Charles W. Lanham
Assistant Examiner—Carl E. Hall

[57] ABSTRACT

A power factor correction capacitor is constructed of several capacitor packs, each having convolutely wound layers of aluminum foil and polypropylene film with two layers of polypropylene film between the layers of foil. The several capacitor packs are assembled into a case and impregnated with trichlorodiphenyl with a bis (3, 4-epoxy-6-methylcyclohexylmethyl) adipate as an additive. During the winding process the foil is deformed by a deforming roller rolled against the roll of foil as it is wound into the capacitor pack.

9 Claims, 13 Drawing Figures

MACHINE FOR WINDING AN ELECTRICAL CAPACITOR

This application is a division of application Ser. No. 255,156, filed May 10, 1972, now U.S. Pat. No. 3,746,953.

This invention relates to machines for manufacturing power capacitors, particularly power capacitors with capacitor packs having alternate layers of foil and film and a dielectric impregnant, method and machine for manufacturing power capacitors.

In the construction of capacitors, particularly power factor correction capacitors, it is necessary to achieve a relatively low loss capacitor with a high energy density, long life, and reliability at a reasonable cost. It is standard practice to use aluminum foil as the electrode and to use two layers of polypropylene film separated by paper as the dielectric material between the layers of foil with a chlorinated diphenyl and a suitable stabilizing additive as an impregnant. In the development of capacitors the paper-polypropylene, or paper-film, capacitor was an improvement over the older all-paper capacitors which used only paper between the foils. The paper-film capacitor, as compared to the all-paper capacitor, has about one-third the losses, 30% greater energy density, and increased reliability. Also, the paper has a lower average voltage stress resulting in a lower energy density. However, the paper produces a significant amount of dielectric loss. Therefore, it has been apparent that elimination of the paper could produce a superior capacitor. However, after much experimentation and development work, the creation of a fully satisfactory all-film capacitor has not been previously achieved.

With this invention a low cost all-film capacitor that is highly reliable and efficient and, in fact, has all the desirable characteristics of and is in many ways superior to the paper-film capacitor is provided. This is accomplished primarily by modification of the manufacturing techniques and by selectively deforming the foil in a manner that enables substantially complete impregnation of the film by the chlorinated diphenyl.

Objects and advantages of the invention will be apparent from the following detailed description.

Figure 1:
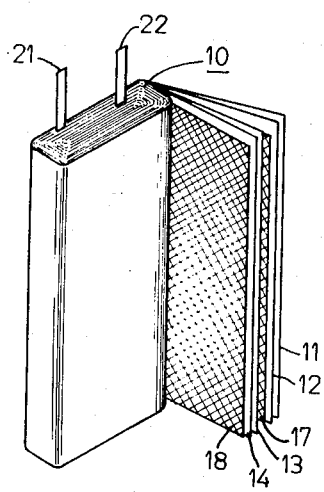
FIG. 1 is a perspective view of a capacitor pack constructed according to this invention.

Referring to FIG. 1, a capacitor pack 10 comprises film strips 11 and 12 of any suitable dielectric polymeric film forming a first film layer, film strips 13 and 14 forming a second film layer, and foil strips 17 and 18 of any suitable conductive material between the film layers convolutely wound and compressed to form a flattened pack as shown. Film strips 13 and 14 are wound between foil 18 and foil 17 of the next layer of film and foil, and strips 11 and 12 are wound between foil strips 17 and 18, all continuously wound to produce a capacitor pack having two plates or electrodes formed by foil strips 17 and 18, respectively. Electrical connecting tabs 21 and 22 are inserted to make an electrical connection to foil strip 17 and foil strip 18, respectively, in a manner known in the art.

Figure 2:
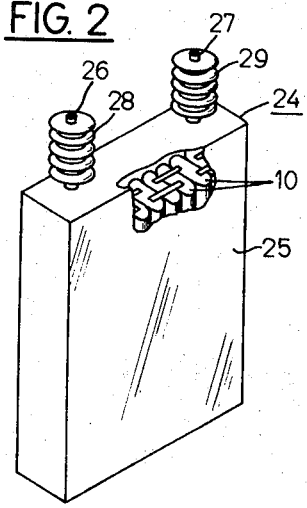
FIG. 2 is a perspective view of a power capacitor having several capacitor packs, as shown in FIG. 1, connected in series.

Referring to FIG. 2, a power capacitor 24 comprises a casing 25, several capacitor packs 10 connected in series or as desired to provide a desired characteristic for the capacitor, and electrical terminals 26 and 27 mounted within insulating bushings 28 and 29, respectively, which are mounted in openings in casing 25. The capacitor uses any suitable metallic foil, such as aluminum foil, as the conductive foil and is impregnated with a suitable dielectric organic liquid, typically a halogenated aromatic compound such as, for example, trichlorodiphenyl. For best results a suitable stabilizing additive is added to the dielectric liquid and may be, for example, any suitable epoxide, such as bis (3, 4-epoxy-6-methylcyclohexylmethyl) adipate. The dielectric film is a suitable dielectric polymeric compound, such as, for example, polypropylene.

Figure 3:
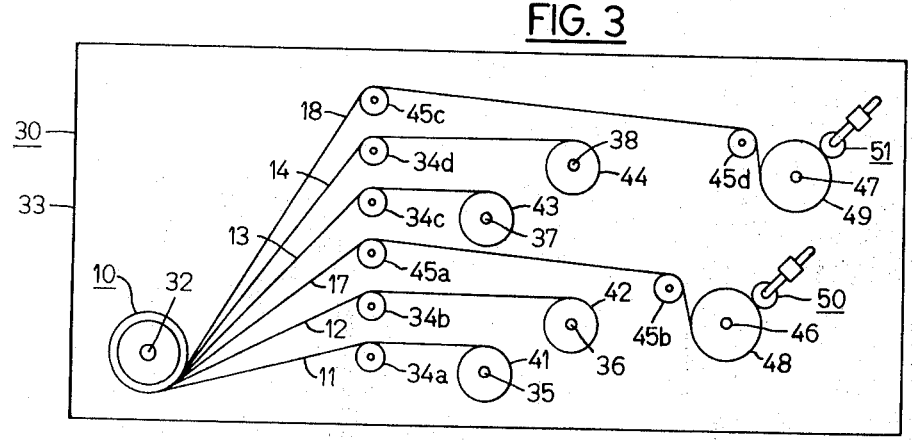
FIG. 3 is a simplified schematic drawing of a capacitor winding machine used to wind the capacitor pack shown in FIG. 1.

Referring to FIG. 3, a capacitor winding machine 30, generally of any known type that may be used to wind a capacitor pack, such as capacitor pack 10, is shown in a simplified form and comprises a winding means for winding film strips 11, 12, 13 and 14 and foil strips 17 and 18 into a capacitor pack; a film holding means for holding and unwinding rolls of film; a foil holding means for holding and unwinding rolls of foil; a control means for controlling the winding means, the film holding means, and the foil holding means to effect the unrolling of rolls of film and foil and the winding onto the winding means to form the capacitor pack; and a deforming means for deforming the foil by applying a selected pressure at selectively positioned points to the roll of foil as it is being unwound to produce selected deformation through several layers of foil on the roll.

The winding means comprises a winding spindle or roller 32 mounted on a panel 33 and rotatable by any known means (not shown) in a clockwise direction (as seen in FIG. 3) to roll the foil strips and film strips into capacitor pack 10.

The film holding means comprises idler rollers 34a, 34b, 34c and 34d, film spindles or rollers 35, 36, 37 and 38, each adapted in any known manner to hold and unwind film rolls 41, 42, 43 and 44, respectively, by being controllably rotated in a counterclockwise direction by any known means (not shown).

The foil holding means comprises idler rollers 45a, 45b, 45c and 45d; spindles or rollers 46 and 47 adapted to hold and unwind foil rolls 48 and 49, respectively, by being controllably rotatable in a counterclockwise direction by any known means (not shown).

A control means of any known type (not shown) controls the speed of rotation of winding roller 32 and to the degree necessary the rotation of film rollers 35, 36, 37 and 38 and foil rollers 46 and 47 to assure a tight uniform capacitor pack in any manner known in the art. This may be done by controlling and correlating the rotation of the rollers or by placing appropriate controlled tension on the rollers to insure a tight roll and to insure that breaking does not occur as the film and foil are wound into a capacitor pack.

Figure 4:
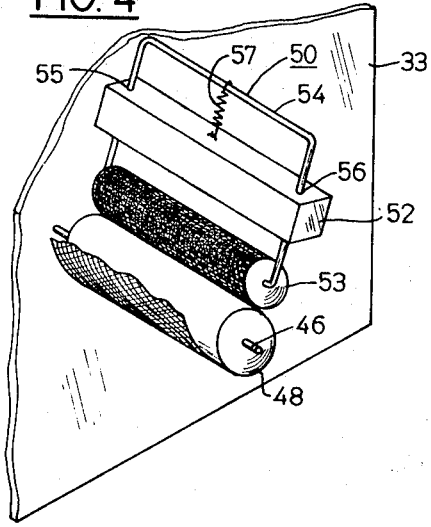
FIG. 4 is a simplified perspective view of a portion of the winding machine shown in FIG. 3 showing the deforming roller and foil roll in more detail.

The deforming means comprises a deforming roller assembly 50 and a similar deforming roller assembly 51 each adjacent foil rolls 48 and 49, respectively, to deform the foil on each foil roll. Referring to FIG. 4, deforming roller assembly 50 is shown in a simplified and schematic form, is mounted on panel 33, and comprises a support block 52 mounted on panel 33 in any known manner adjacent to foil roll 48 and foil roller 46, a deforming roller 53, a roller support frame 54 passing through guide holes 55 and 56 in support block 52 and supporting deforming roller 53, and a biasing means including a spring 57 connected between support frame 54 and support block 52 to apply compressive force between deforming roller 53 and foil roll 48. The biasing means may be of any known type that can apply a controlled and even force to force roller 53 against foil roll 48. The roller assemblies thus include a means for forcing the deforming rollers to press against foil rolls 48 and 49 with a selected force furnished by some appropriate means such as spring 57 so that some degree of deformation takes place through several layers of foil.

Figure 11:
FIG. 11 is a partial detailed view of the deforming roller shown in FIG. 10.
Figure 10:
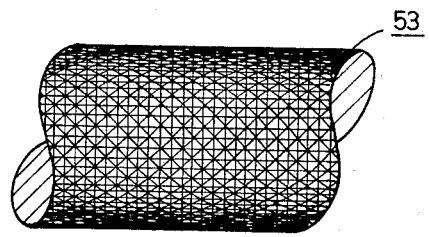
FIG. 10 is a more detailed showing of the roller shown in FIG. 4.

Referring to FIGS. 10 and 11, deforming roller 53 is shown in a schematic detail and has spirally cut pyramidal shaped points 61 resulting from oppositely spiraling grooves 62 and 63 and preferably has the points positioned about fourteen to the inch across the roller. This configuration has been shown to provide a satisfactory deformation of the foil with a reasonable pressure, in the range of 1500 grams/linear inch of contact, which will result in satisfactory impregnation of the capacitor rolls when assembled.

Figure 5A:
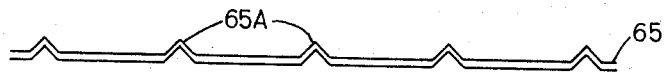
FIGS. 5A, 5B and 5C are end views of foil sections illustrating three exemplary types of deformations of the foil that occur.
Figure 5B:
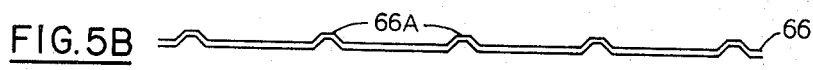
Figure 5C:
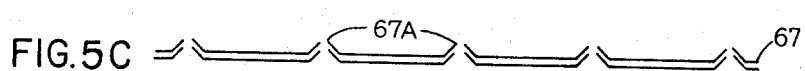
Figure 6:
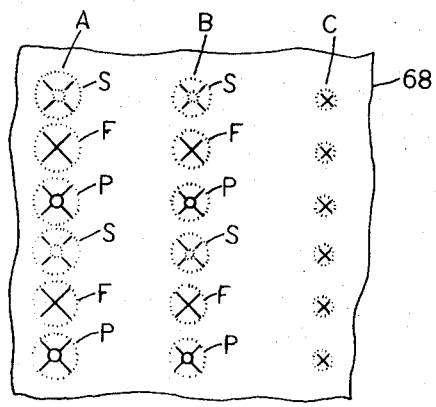
FIG. 6 is a top view of a foil section of foil having exemplary deformations as in FIG. 5.

Referring to FIGS. 5A, 5B and 5C, exemplary foil strip sections 65, 66 and 67 have deformations resulting from deforming roller 53. The deformations can be categorized to be said to take any one of the three forms 65A, 66A or 67A on foil sections 65, 66 and 67, respectively. Deformations 65A conform to the configuration of points 61 of deforming roller 53, deformations 66A have blunted edges and take a truncated pyramidal form, and deformations 67A are perforations caused as points 61 force through the foil. The perforation holes are small, with a maximum size of about pinhole size, and just barely visible to the naked eye when viewed against a bright light behind the foil. Having about twenty per cent of the indentations perforated seems to be a good portion to insure proper impregnation although the range can apparently be quite great, perhaps up to about fifty per cent or more. The foil has a combination in a random manner of the three different types of deformations and of the variations of each type to produce an exemplary foil strip section 68 as shown in FIG. 6. The deformations are a combination of the three deformations shown in FIG. 5 in combination with lesser deformations and indentations caused by the effect of the points through several layers of foil as pressed upon by the deforming roller. The maximum depth of deformation allowable appears to be about eight mils, but a maximum depth of about six mils seems to be best. Contrary to usual expectations the deformations do not take up extra space in the capacitor if generally within these tolerances.

FIG. 6 shows an idealized, theoretical deformation that would occur in these rows, A, B and C, through three layers. Actually, there is overlapping of these deformations and there is some effect through about thirty to fifty layers when applied to foil of about 0.22 mils in thickness, a size of foil that has been shown to be highly satisfactory. A spacing between the rows of about one-fourteenth of an inch has been found to be satisfactory to accomplish this with a deforming roller having pyramidal points extending upwardly by about 0.039 inches above the base of the grooves, as shown in FIG. 11. The first row A shows typical indentations placed on the outer layer with some full depressions F, some smaller depressions S, and some depressions P producing perforations. The second row B shows something that can occur at the second layer with a few full depressions F, a few partial depressions S, and a few perforations P, and the third row C shows the effect at the third layer where perforations are not likely to occur and the depressions ar not as deep or as sharply formed. The random combination and variations of these through the several layers combine to superimpose the deformations on top of each other in a random manner along the rolls as the foil is unwound. If considered necessary, two deforming rollers could be used for each roll of foil to insure a random pattern.

Figure 7:
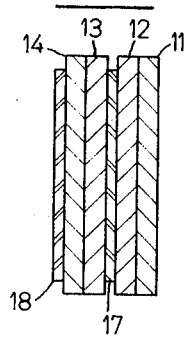
FIGS. 7, 8 and 9 are partial sectional end views of a capacitor pack showing different configurations of lapping of the foil and film.
Figure 8:
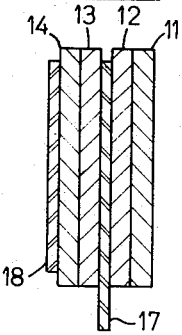
Figure 9:
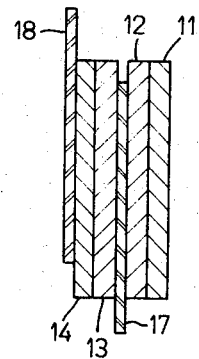

Referring to FIGS. 7, 8 and 9, since it is apparently easier to wet with the liquid dielectric along the foil-film layers than it is between film layers, it may be desirable to have at least one foil strip, such as foil strip 17, as shown in FIG. 8, or both foil strips 17 and 18, as shown in FIG. 9, extend outwardly from the capacitor pack. However, all the configurations shown in FIGS. 7, 8 and 9 appear to be satisfactory.

An all-film capacitor constructed according to this invention has been found to provide excellent characteristics. One of the characteristics studied is the corona starting voltage of several samples using two sheets of one-half mil polypropylene film with the film extended beyond the deformed foil as shown in FIG. 7. It was found that the corona starting voltages were very consistent over many series of tests and after many hours of operation had remained in the range of 2600 to 3250 volts. This has been found true even though the usual expectation of those skilled in the art was that deformations would be harmful because of increased electrical stresses at the deformation. The tests conducted on units according to this invention indicate that this is not true, and the units were found to be superior to filmpaper capacitors.

Another advantage of this invention occurs in the method of construction of capacitors in that complete impregnation of the dielectric into the capacitor has been obtained without a previously required heating process. Previously, capacitor manufacturing required heating the capacitor pack to a temperature of 180° F or higher and applying a high vacuum to draw off any volatile material, such as water vapor, from the capacitor pack. After the capacitor pack had been sufficiently dried, it was cooled and an impregnant was added to impregnate the dielectric material. The capacitor pack was then typically permitted to remain under vacuum with the temperature above 120° F but lower than about 170° F. The capacitor was then sealed and ready for the manufacturing processes.

A capacitor constructed according to this invention eliminates a large amount of the moisture present in the capacitor because of the absence of paper since the film and foil do not substantially retain much water vapor and gas. Therefore, the small amount of moisture removal necessary can be accomplished at room temperature or at only a slightly elevated temperature of about 80° and 90° F. This results in a shorter drying time, and no cooling of the unit is required before liquid is admitted for impregnation purposes, thereby substantially reducing the total processing time required.

Therefore, according to this invention a method of constructing capacitors comprises winding a capacitor pack with convolutely wound alternate layers of film and foil with two layers of film between each layer of foil, deforming the foil by using a deforming roller of the type shown pressing with a selected pressure against the roll of foil as it is being wound onto the capacitor roll. The pressure is selected to produce indentations of the type desired within a selected range of depths and selected percentage of perforations. After the capacitor roll is wound, it is then shaped into the desired shape and placed into a standard capacitor casing. The capacitor is then put under vacuum at room temperature or a slightly raised temperature, and then is subsequently impregnated with a dielectric liquid such as chlorinated diphenyl. The capacitor is then sealed and prepared for further manufacturing processes.

We claim:

1. A machine for winding capacitor rolls comprising:

a winding means for receiving and winding layers of dielectric film and conductive foil to form a capacitor pack;

a film holding means for holding and unwinding rolls of dielectric film;

a foil holding means for holding and unwinding rolls of conductive foil;

a control means for selectively controlling the winding means, the film holding means, and the foil holding means to wind film and foil onto the winding means from the rolls of film and foil held by said film holding means and foil holding means, respectively, to form a capacitor roll; and a deforming means adjacent a roll of foil held by the foil holding means for selectively deforming the foil while on the roll at selectively positioned points through several layers of foil as the foil is rolled off the roll of foil.

2. A machine according to claim 1 wherein said deforming means comprises a rotatable deforming roller positioned to roll against the roll of foil.

3. A machine according to claim 2 wherein said deforming roller comprises pyramidal shaped raised points equally spaced from each other.

4. A machine according to claim 3 wherein said deforming roller comprises a first plurality of equally spaced and parallel spiral grooves and a second plurality of equally spaced and parallel spiral grooves intersecting the first plurality of groves at an angle with said grooves having a shape to form pyramidal shaped points between the sets of intersections of adjacent and crossing grooves.

5. A machine according to claim 4 wherein said deforming means comprises a means for biasing the roller against the roll of foil with a selected force.

6. A machine according to claim 2 wherein said deforming roller comprises a first plurality of equally spaced and parallel spiral grooves and a second plurality of equally spaced and parallel spiral grooves intersecting the first plurality of groves at an angle with said grooves having a shape to form pyramidal shaped points between the sets of intersections of adjacent and crossing grooves.

7. A machine according to claim 6 wherein said deforming means comprises a means for biasing the roller against the roll of foil with a selected force.

8. A machine according to claim 2 wherein said deforming means comprises a means for biasing the roller against the roll of foil with a selected force.

9. A machine according to claim 8 wherein said deforming roller comprises pyramidal shaped raised points equally spaced from each other.

* * * * *